UNITED STATES PATENT OFFICE.

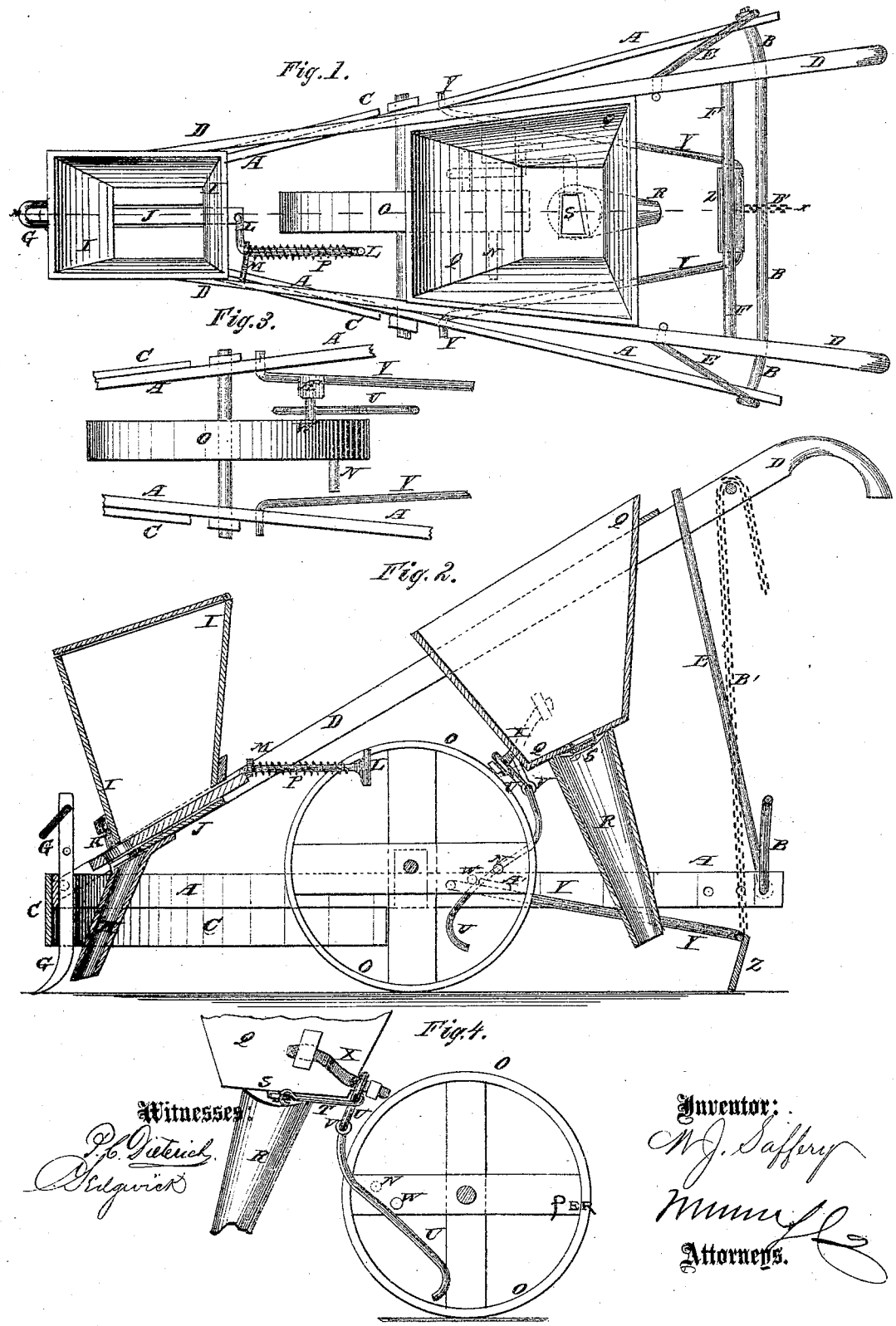

WILLIAM J. SAFFERY, OF BREMEN, OHIO.

IMPROVEMENT IN SEED-PLANTERS.

Specification forming part of Letters Patent No. 140,648, dated July 8, 1873; application filed March 15, 1873.

*To all whom it may concern:*

Be it known that I, WILLIAM J. SAFFERY, of Bremen, in the county of Fairfield and State of Ohio, have invented a new and useful Improvement in Seed-Planter, of which the following is a specification:

Figure 1 is a top view of my improved machine. Fig. 2 is a vertical longitudinal section of the same taken through the line $xx$, Fig. 1. Fig. 3 is a detail view of the device for operating the covering-hoe. Fig. 4 is a detail view of the device for operating the dropping device of the fertilizer-hopper.

Similar letters of reference indicate corresponding parts.

The invention consists in combining a furrow-opener, a seed-dropper, a rolling coverer, and a guano or manure dropper, so that, between the seed and the guano, there will always be a small layer of fine dirt to prevent the destruction of the vitality of the seed.

A are two bars, the forward ends of which meet and are secured to each other, and their rear ends are connected and held in their proper relative position by a bar or rod, B, which is curved or arched, as shown in Figs. 1 and 2, to prevent it from coming in contact with the hills formed by the covering-hoe. To the forward parts of the bars A are attached plates C, which project downward, as shown in Fig. 2, and which are designed to push back lumps, clods, stones, &c., out of the way of the dropping and covering devices, and also out of the way of the plows when cultivating the young plants to prevent them from being broken, injured, or knocked down by lumps or clods thrown against them by said plows. D are the handles, which are made long, and their forward ends are secured to the forward ends of the bars A. The handles D are supported at the desired elevation by standards E, the lower ends of which are attached to the rear ends of the bars A, and their upper ends are attached to the said handles D. The handles D are held at the proper distance apart by a rod or round, F. To the bars A, at their point of intersection, is secured the plow G for opening the furrow to receive the seed. The standard of the plow G projects above the bars A, and has several holes formed in it to receive an open ring or hook for the attachment of the draft. To the bars A, in the rear of the plow-standard G, is attached a spout, H, to receive the seed from the hopper I, and conduct it into the bottom of the furrow opened by the plow G, close in the rear of the said plow before the soil can fall in from the sides of said furrow and partially fill it. The hopper I is attached to the lower part of the handles D, and in a groove in its bottom works a slide-bar, J, which has a hole in it of sufficient size to contain enough seed for a hill, so as to receive the seed from the hopper I, carry it out of said hopper, and discharge it into the conductor-spout H. To the forward side of the hopper I is secured a small brush, K, to prevent any more seed than enough to fill the hole in the bar J from being carried out by said bar. To the rear end of the sliding bar J, at the rear side of the hopper I, is attached a rod, L, which projects to the rearward, passes through a guide, M, attached to one of the handles D, and has a cross-head formed upon its rear end. The slide J is moved forward to drop the seed by a pin, N, attached to the supporting or ground wheel O, and is drawn back to again receive seed from the hopper by a spring, P, coiled around the rod L. The forward end of the spring P rests against the guide M, and its rear end rests against the cross-head of the said rod L. The journals of the wheel O revolve in bearings attached to the middle parts of the bars A, and which should be made detachable, so that the wheel O can be conveniently removed when desired. To the handles D, a little in the rear of the wheel O, is attached a hopper, Q, for guano or other fine fertilizer to be dropped upon the seed before it is covered. To the bottom of the hopper Q is attached a spout, R, for conducting the fertilizer to the ground. The fertilizer passes from the hopper Q to the spout R, through a hole in the bottom of the said hopper. S is a plate pivoted to the bottom of the hopper Q, in such a position that its inner end may close the opening in the bottom of the said hopper. To the projecting end of the plate S is pivoted the end of a short connecting-rod T, the other end of which is pivoted to the lever U, which is pivoted to a support, V, attached to the hopper Q. The lever U projects downward and forward, so as to be struck by a pin, W, attached to the wheel O, and operated to remove the plate S from the opening in the bottom of the hopper Q, to allow the fertilizer to escape. The plate S is moved back to close the opening in the bottom of the hopper Q, by a spring, X, one end of which is attached to the hopper Q, and its other end to the upper end of the lever U. Y are two arms, the forward ends of which are pivoted detachably to the middle part of the bars A, and to their rear ends is attached the hoe Z, for covering the seed. To one of the bars Y, is attached a small stop-plate, A', in such a position that the pin W, at each revolution of the wheel O, will strike against it and raise the hoe Z to drop the soil collected by said hoe upon the seed and cover it. As the pin W escapes from the plate A' the hoe Z drops to the ground, ready to be again raised to cover the next hill. B' is a chain, one end of which is secured to one of the rods Y, or to the hoe Z, and its other end is connected with the rear part of the handle D, so that the hoe can be conveniently raised from the ground when desired.

By detaching the hoppers the ground-wheel, the hoe, and the scraper-plates, and by attaching plows to the rear parts of the bars A, the machine may be effectively used as a cultivator.

Having thus described my invention, I claim as new and desire to secure by Letters Patent—

The combination in a seeder, of a seeder in front, a guano-dropper in the rear, and an intermediate wheel, O, all arranged in the same vertical longitudinal plane with the furrow-opener G, as described, so that the seed may be slightly covered with soil by the wheel before the guano is dropped upon it, and all danger thereby removed of destroying the vitality of any of the seed.

WILLIAM JOHN SAFFERY.

Witnesses:
 E. S. GARDNER,
 W. J. DROHAN.